United States Patent [19]
Lashmett et al.

[11] Patent Number: 5,709,234
[45] Date of Patent: Jan. 20, 1998

[54] METHOD AND APPARATUS FOR REMEDIATING CONTAMINATED MATERIAL

[75] Inventors: Brent J. Lashmett, Embarrass; Doug C. Lashmett; H. W. Lashmett, both of Babbitt; Larry R. Herzog, Mt. Iron; Thomas P. Tri, Duluth, all of Minn.

[73] Assignee: B&S Research, Inc., Embarrass, Minn.

[21] Appl. No.: 508,351

[22] Filed: Jul. 27, 1995

Related U.S. Application Data

[63] Continuation-in-part of Ser. No. 283,611, Aug. 1, 1994, Pat. No. 5,492,139.

[51] Int. Cl.$^6$ ........................................ B08B 3/10
[52] U.S. Cl. ...................... 134/92; 134/115; 134/95.2; 134/90; 34/197
[58] Field of Search .................. 34/126, 90, 194, 34/195, 197, 238; 134/111, 90, 92, 115, 76, 95.2, 102.3; 68/19.2, 20

[56] References Cited

U.S. PATENT DOCUMENTS

| | | | |
|---|---|---|---|
| 240,404 | 4/1881 | Gibbs | 134/90 |
| 2,195,123 | 3/1940 | Pabst | 68/20 |
| 2,416,475 | 2/1947 | Friedman | 134/76 |
| 2,464,573 | 3/1949 | Helm | 34/197 |
| 2,615,455 | 10/1952 | Persson | 134/162 |
| 2,780,876 | 2/1957 | Inman | 34/90 |
| 2,903,002 | 9/1959 | Adkins | 134/162 |
| 3,262,085 | 1/1966 | Clifford et al. | 34/90 |
| 3,367,043 | 2/1968 | Torigian | 34/197 |
| 3,511,297 | 5/1970 | Webb | 34/195 |
| 3,626,601 | 12/1971 | Moore | 34/90 |
| 4,190,965 | 3/1980 | Erickson | 34/197 |
| 4,237,063 | 12/1980 | Glucksman | 34/238 |
| 4,282,256 | 8/1981 | Evich et al. | |
| 4,380,127 | 4/1983 | Roberts | 34/197 |
| 4,665,655 | 5/1987 | Woodard | 134/76 |
| 5,215,004 | 6/1993 | Su | 34/238 |
| 5,322,078 | 6/1994 | Tuttle | |
| 5,377,704 | 1/1995 | Huddle | 134/76 |
| 5,513,666 | 5/1996 | Fujiwara | 134/76 |

FOREIGN PATENT DOCUMENTS

| | | |
|---|---|---|
| 0 289 875 A1 | 11/1988 | European Pat. Off. |
| 0 309 432 A3 | 3/1989 | European Pat. Off. |
| 42 09 052 A1 | 2/1993 | Germany |
| WO92/16314 | 10/1992 | WIPO |

*Primary Examiner*—Frankie L. Stinson
*Attorney, Agent, or Firm*—Zarley, McKee, Thomte, Voorhees, & Sease

[57] ABSTRACT

The apparatus of the present invention includes a dryer for reusable material which includes a housing having a top, bottom wall, and a side wall that together define a chamber. A flue connects a fan to the chamber. A heating mechanism is positioned adjacent the flue and thereby in communication with the drying chamber. The fan displaces air warmed by the heating mechanism toward an opening in one of the top, bottom wall or side wall and through a removable porous basket for holding remediated material that can be adapted to fit in covering relation over the opening. Thus, the reusable remediated material is quickly dried. This dryer can be used in combination with a washer tank and a quick-dumping removable porous basket adapted to fit into the tank and hold the remediated materials during washing as well as drying. The method of drying wet reusable material includes placing such material in a porous basket over the top opening of a dryer and forcing warm dry air through the top opening and said porous basket until the wet reusable material contained therein is dry.

3 Claims, 4 Drawing Sheets

Dry Solids

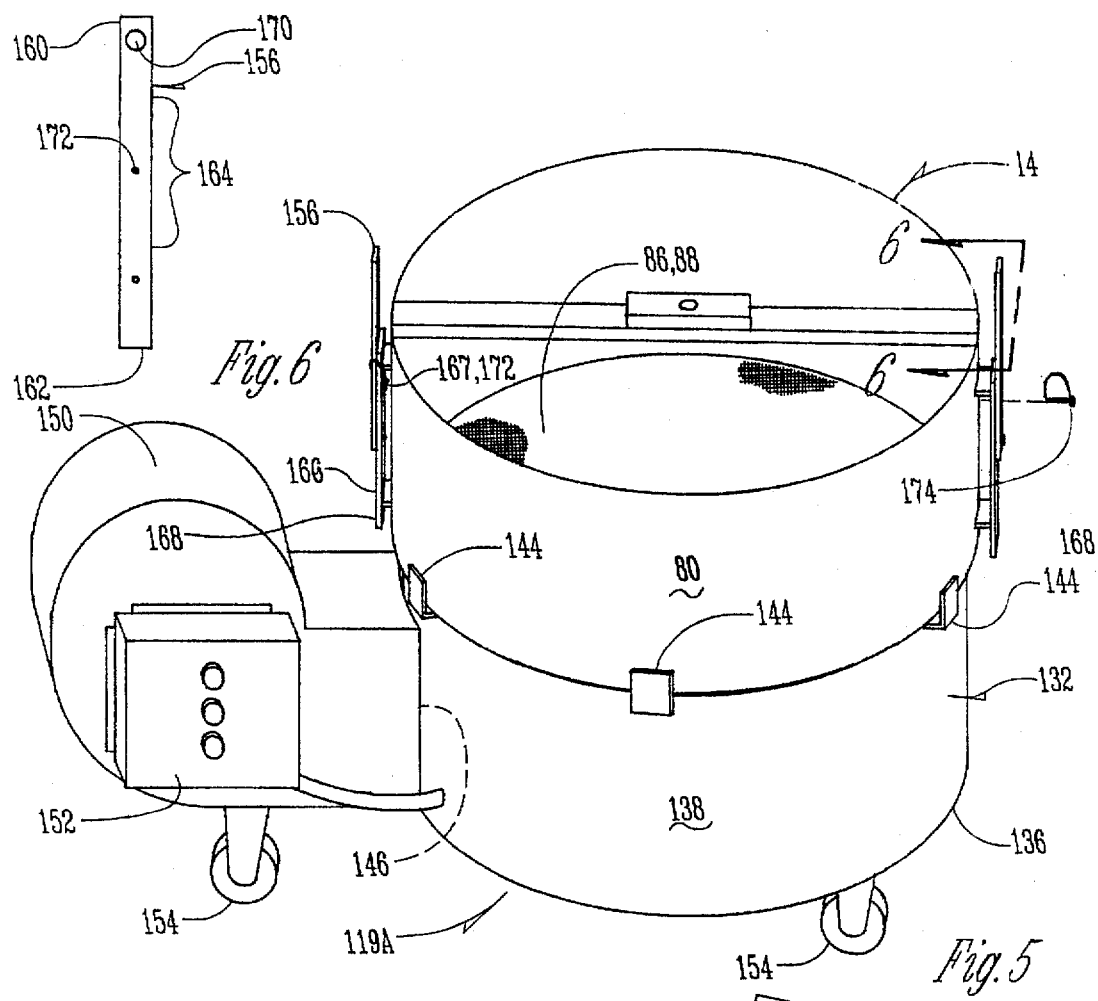
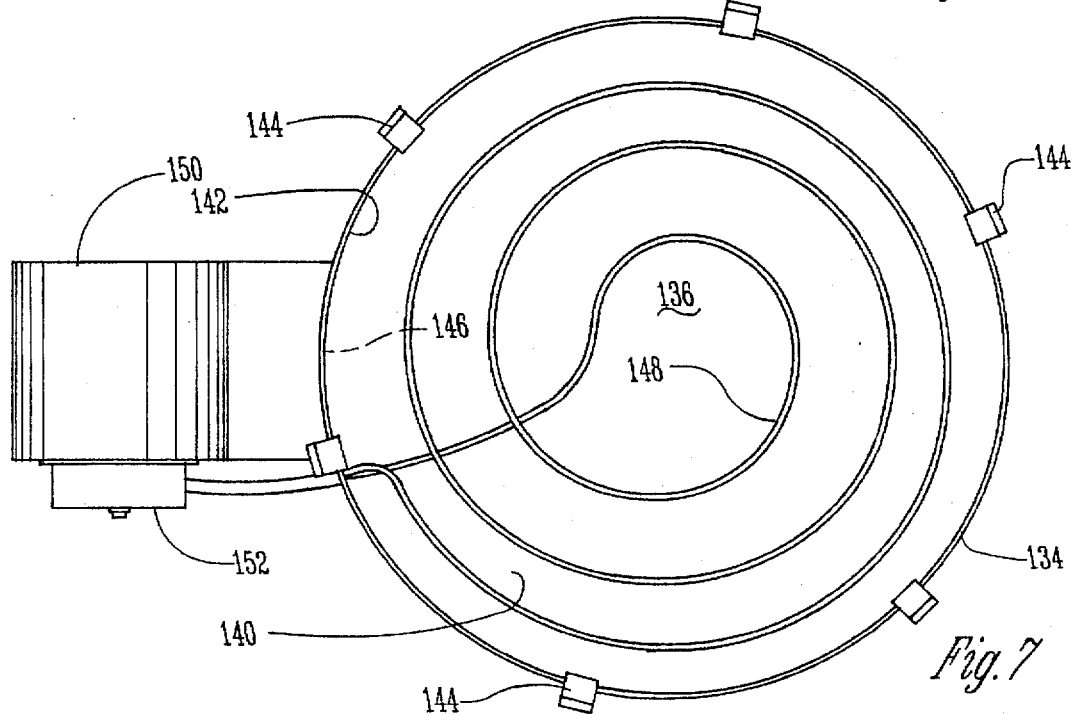

5,709,234

METHOD AND APPARATUS FOR REMEDIATING CONTAMINATED MATERIAL

This is a continuation-in-part of United States Ser. No. 08/283,611 filed on Aug. 1, 1994, now U.S. Pat. No. 5,492,139.

BACKGROUND OF THE INVENTION

The present invention relates to a method and apparatus for remediating contaminated material.

Many materials and objects exposed to oil, PCB, and other hydrocarbon contaminates can be reused if an appropriate cleaning process is provided. As used herein, the term "contaminated materials" can include any material contaminated by the above contaminates, whether that material be granulated (such as floor dry materials or sweeping compounds), mats, rubber beads, air filters for waste centers, used oil filters, or any other material or object which during use is capable of absorbing contaminates.

Cleaning fluids are available which contain various chemicals, emulsifiers, and other cleaning agents which are capable of separating the hydrocarbon contaminates from the objects or materials to be cleaned. Agents also are known which contain microorganisms capable of consuming the contaminates.

However, there is a need for equipment and for a method of operating the equipment which provides satisfactory use of these various specialized cleaning agents to remove the contaminates from the reusable materials so that the reusable materials can be recycled.

Therefore a primary object of the present invention is the provision of an improved method and apparatus for remediating contaminated material.

A further object of the present invention is the provision of a method and apparatus which will permit the remediating of various contaminated materials or objects of various shapes and sizes.

A further object of the present invention is the provision of a method and apparatus for collecting the contaminant after they have been removed from the reusable materials.

A further object of the present invention is the provision of a method and apparatus for drying the reusable materials after the contaminates have been removed.

A further object of the present invention is the provision of an apparatus and method which are efficient in operation, durable in use, and economical to manufacture.

SUMMARY OF THE INVENTION

The method of the present invention removes a contaminated material from a combination material containing the contaminating material and a reusable material. The method comprises placing the combination material in a tank having a cleaning or separating fluid therein capable of separating the contaminating material from the reusable material. The fluid is circulated around the combination material within the tank so that the fluid will cause the contaminating material to separate from the reusable material and will cause at least some of the contaminating material to float on the top surface of the fluid within the tank. The method further comprises drawing off the contaminated material which is floating on the top surface of the fluid and removing it from the tank. Then the reusable material is removed from the tank and dried in a dryer. The apparatus of the present invention includes a tank having a plurality of side walls and a bottom wall enclosing a cleaning chamber for containing the cleaning fluid. A skimming opening is provided in one of the side walls of the tank and is positioned a first distance above the bottom wall. The skimming opening provides fluid communication from within the cleaning chamber to outside the cleaning chamber. A fluid circulation manifold is positioned adjacent the bottom wall of the tank within the cleaning chamber. The manifold has a plurality of spray openings therein for introducing fluid into the cleaning chamber. A fluid outlet opening is provided in one of the side walls and bottom wall and is connected to a recirculation pump by means of a conduit system. The conduit system connects the fluid outlet opening to the recirculation pump and connects the recirculation pump to the fluid circulation manifold. The pump then causes the separating fluid within the tank to be circulated from the outlet opening, to the pump and from the pump to the manifold where the fluid is recirculated into the cleaning chamber through the spray holes in the manifold. A contaminant container is positioned outside the fluid chamber and in fluid communication with the skimming opening for receiving the contaminating material which exits through the skimming opening in the tank wall.

The apparatus of this invention also can include a dryer for drying the reusable materials after the contaminant has been removed.

BRIEF DESCRIPTION OF THE DRAWINGS

FIG. 5 is a perspective view of an alternate forced air embodiment of the dryer of the present invention with the basket mounted thereon.

FIG. 6 is an enlarged view taken along line 6—6 of the lifting bracket of FIG. 5.

FIG. 7 is a top view of the forced air dryer of FIG. 5 with the basket removed.

DETAILED DESCRIPTION OF THE DRAWINGS

Figure 1:
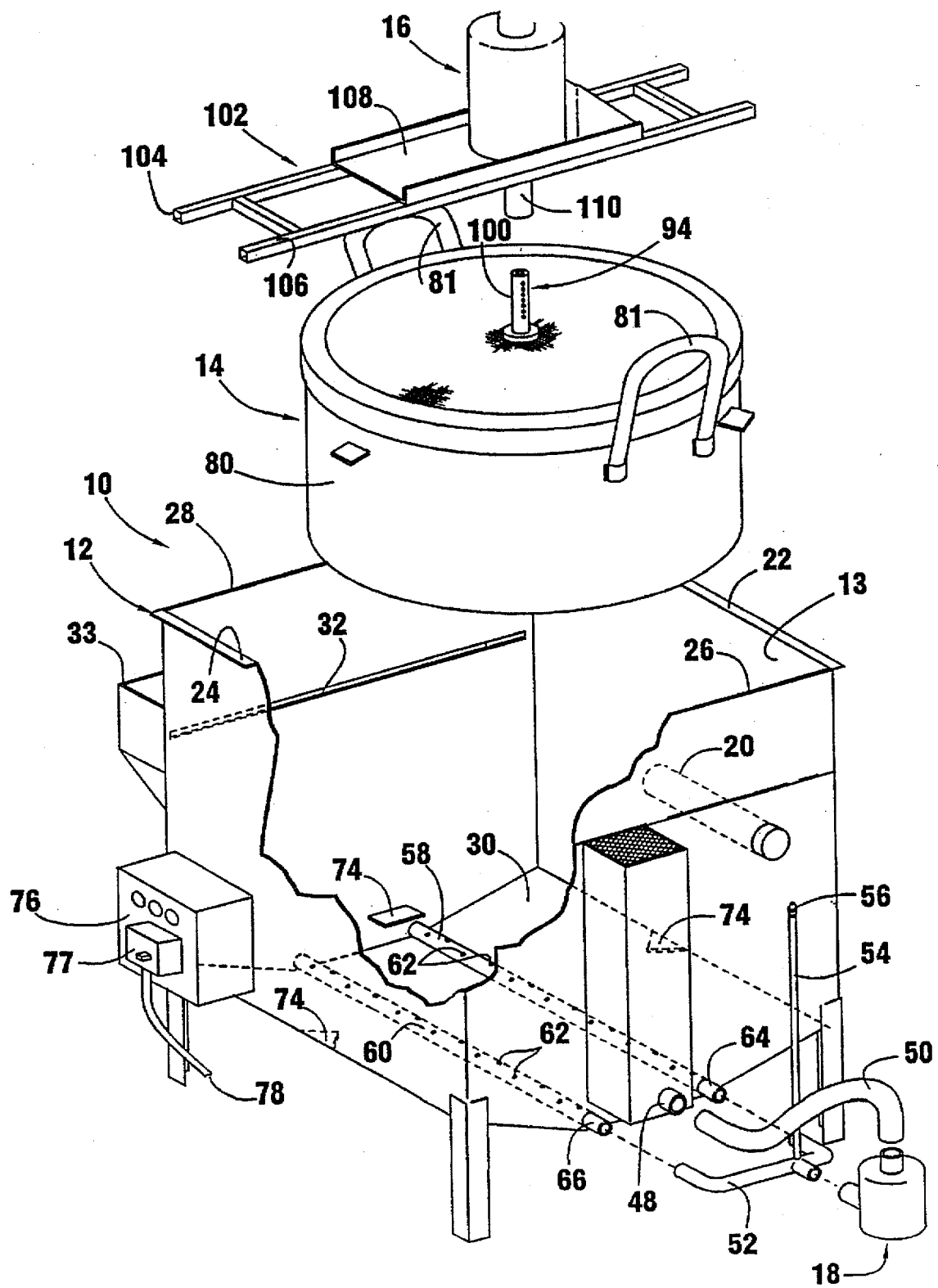
FIG. 1 is an exploded pictorial view of the apparatus of the present invention.

Referring to the drawings, the numeral 10 generally designates a cleaning apparatus of the present invention. Apparatus 10 includes a tank 12 having a cleaning chamber 13 therein. A basket 14 is adapted to be placed within the cleaning chamber 13, and an agitator motor 16 is adapted to be fitted over and agitator (to be described hereinafter) within the basket 14. Apparatus 10 also includes a recirculating pump 18 and an electrical heating element 20. A gas heater may also be used instead of an electrical heating element 20.

Tank 12 includes two side walls 22, 24 two end walls 26, 28 and a bottom wall 30. An elongated horizontal skimming slot 32 is provided in end wall 28. Outside end wall 28 is a skimming container 33 having a skimming chamber 34 which in fluid communication with the skimming slot 32. Skimming chamber 34 includes at its lower end an outlet 36 having a valve 38 which may be opened or closed to remove the contents of the skimming chamber 34.

The end wall 26 includes a rectangular outlet opening 40 therein which is covered with a filter 42 so as to permit fluid within the cleaning chamber 13 to pass through the outlet opening 40, with the filter 42 filtering out any materials in the fluid.

A recirculating housing 44 is mounted outside end wall 26 and forms a recirculating chamber 46 which is in communication with and outside the outlet opening 40 in wall 26. At the lower end of recirculating chamber 46 is a conduit connection 48 which is adapted to be connected to a pump inlet conduit 50. Pump inlet conduit 50 is connected to the inlet of pump 18, and a Y shaped pump outlet conduit 52 is connected to the outlet of pump 18. An air stand pipe 54 having an air nipple 56 on the upper end thereof is connected to and in communication with the Y shaped pump outlet conduit 52.

Within the cleaning chamber 13 of tank 12, and extending in parallel relation to one another along the bottom wall 30 thereof, are a pair of recirculation pipes or manifolds 58, 60 each of which include a plurality of spray holes 62 therein. Manifolds 58, 60 include pipe connections 64, 66 respectively which extend through the end wall 26 of the tank 12 and which are connected to the two Y ends of the pump outlet conduit 52.

Bottom wall 30 of the tank 12 includes a drain hole 68 which is connected to a drain pipe 70 having a valve 72 therein for draining the contents of cleaning chamber 30. Mounted within the cleaning chamber 13 and extending inwardly from each of the side walls 22, 24 and the ends walls 26, 28 are a plurality of support flanges 74. Flanges 74 are spaced approximately four inches above the bottom wall 30 and are intended to provide support for the basket 14 when the basket 14 is placed within the cleaning chamber 13.

A control 76 is an electrical box containing a master switch 77 and several switches and timeres which are connected by a control cable 78 to motors 16, 18 and heating element 20. Heating element 20 is located inside washing chamber 13 and is attached to sidewall 26.

Basket 14 includes a cylindrical basket wall 80 having a pair of lifting hooks 81 connected thereto. The top wall of basket 14 is provided by a first screen 82 and a second screen 84. These two screens are of two different sized mesh and intended to provide fluid communication into a basket compartment 83 within basket 14. The bottom wall of the basket 14 is provided by first and second screens 86, 88 which are similar to screens 82, 84. A support bar 90 extends diametrically across the upper end of the basket 14 and includes a shaft opening 91 therein. Basket 14 is intended to contain contaminated material 92 which may be granulated material or objects having various shapes and sizes.

An agitator 94 includes a vertical agitator shaft 96 having a horizontal agitator head 98 secured to its lower end and having a splined receptacle 100 at its upper end.

Motor 16 is supported by a motor support frame 102 having a pair of parallel elongated bars 104, 106 which are joined by a web plate 108. Motor 16 includes a downwardly extending splined motor shaft 110 which is adapted to mate within the splined receptacle 100 so as to provide driving connection between the motor 16 and the agitator 94.

In operation, the cleaning chamber 13 is filled with a separating or cleaning fluid 112. Numerous cleaning fluids are known in the art for removing and separating petrol chemical products from objects to be cleaned. A preferred cleaning material for use in the present invention is as follows:

| Percentage By Volume | Ingredient Description |
| --- | --- |
| 16% | Alcohol |
| 70% | Water (deionized or distilled) |
| 10% | An emulsifier manufactured by CRC Laboratories, Inc., 706 South Seventh Street, Delano, Minnesota and sold under the trademark CLEAN-WISE. |
| ½% | Nutrients selected from phosphorus, nitrogen, sulfur, lime and/or potassium. |
| 1% | A cultured bacterial material containing microorganisms for consuming petro chemical products, sold by B&S Research, Inc., 4345 Hwy. 21, Embarrass, MN 55732 under the trade designation B & S Industrial. |
| 2½% | A catalyst for use with the above cultured bacteria material and sold by B&S Research, Inc., 4345 Hwy. 21, Embarrass, MN 55732 under the trade designation B & S Industrial Achieve. |

Other cleaning fluids may be used without detracting from the invention.

The material or objects to be cleaned are placed within the basket 14 and the basket 14 is placed within the cleaning chamber 13 so that it rests upon the flanges 74 in spaced relation above the recirculation manifolds 58, 60. The heater 20 is activated to cause the fluid within the tank to be heated to the appropriate temperature for causing the maximum vitality and activity of the microorganisms within the fluid. The preferred range of temperature for the fluid should be between 80° and 100° F., and the preferred temperature is approximately 90° F.

The pump 18 is then activated which causes fluid to be drawn from recirculating chamber 46 into the pump and forced outwardly through the spray holes 62 in the manifolds 58, 60. This causes the fluid within the chamber 13 to be circulated and bubbled around and through the materials 92 within the basket 14 thereby exposing the materials 92 to the maximum amount of fluid and microorganisms as possible. As the petrochemicals or oils are separated from the materials to be cleaned, an oil or contaminant layer 114 forms on the top surface of the cleaning fluid. The level of the cleaning fluid is kept adjacent to the skimming slot 32 so that as oil or other contaminants form on the top of the cleaning fluid they are skimmed off through the skimming slot 32 and into the skimming chamber 34. This causes a contaminant reservoir 116 to accumulate within the skimming chamber 34.

The microorganisms contained within the cleaning fluid 112 are aerobic microorganisms which require oxygen. Therefore in order to facilitate the functioning of the microorganisms, the air nipple 56 of stand pipe 54 is connected to a source of pressurized air or oxygen and oxygen is introduced into the pump outlet conduit 52 so as to become disbursed within the fluid being delivered to the two recirculation manifolds 58, 60. Thus as the fluid circulates out through the spray holes 62 into the cleaning chamber 13, air or oxygen is also introduced into the fluid within the chamber 13, and this air or oxygen helps to sustain the microorganisms within the cleaning fluid.

Figure 3:
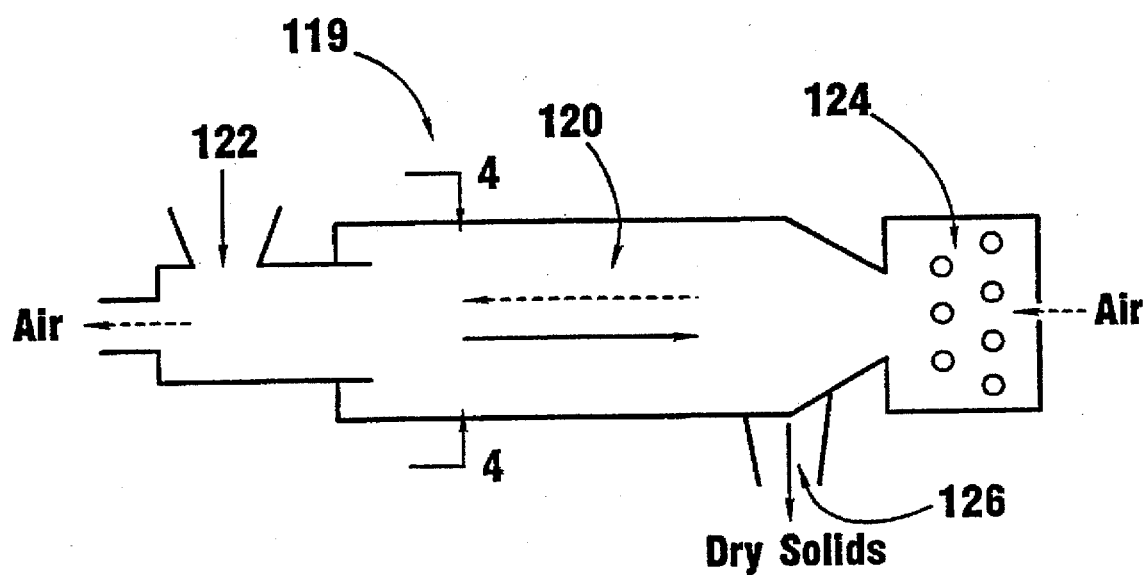
FIG. 3 is a schematic view of a rotary dryer for drying the reusable material after it has been cleaned.

When the materials within the basket 14 have been sufficiently cleaned, the basket is removed from the cleaning chamber 13 and the contents 92 are placed within a dryer such as the rotary dryer 119 shown in FIG. 3. Dryer 119 includes a heating drum 120 having a feed hopper 122 at one end and having heating coils 124 at the opposite ends. Air is introduced in the direction shown by the arrows in FIG. 3, but it flows in a direction opposite to the flow of the reusable material 128 within the drum 120. The drum 120 includes a plurality of fins 130 which grab the material 128 and cause it to tumble within the rotating drum 120. The drum is preferably tilted so as to cause the material 128 to progress from hopper 122 toward a outlet opening 126 at the opposite end of the dryer. The material exits outlet 126 it is dried and ready for reuse.

Figure 4:
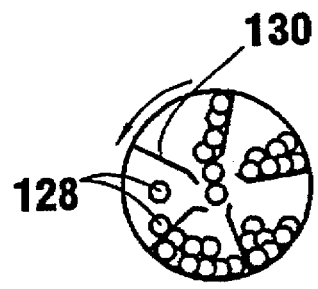
FIG. 4 is a sectional view taken along line 4—4 of FIG. 3.

While the particular drying process shown in FIGS. 3 and 4 may be used for granulated materials, other drying methods may be used without detracting from the invention. Also some objects are not amenable to being dried within a rotating dryer, and in such cases other drying methods may be used.

FIGS. 5–7 illustrate an alternate drying apparatus and method. A forced air dryer 119A includes a housing 132 having a top 134, a bottom wall 136, and at least one side wall 138 interconnecting the top wall 134 and bottom wall 136 and defining a chamber 140 within the housing 132. One of the top 134, bottom wall 136 and side wall 138 includes an opening 142 therein. Preferably opening 142 extends through the top 134 and is adapted to be covered by the basket 14. One or more guide brackets 144 extend upwardly from the side wall 138 to hold the basket 14 in place over the opening 142. The housing 132 includes an intake flue 146 in communication with the chamber 140 through one of the top, side wall 138, or bottom wall 136.

The dryer 119A includes a heating mechanism 148 positioned adjacent the flue 146 and in communication with the chamber 140. Preferably, the heating mechanism 148 is an elongated electric heating element formed into a spiral or other suitable shaped so as to provide uniform heating of the reusable materials. The heating element 148 is preferably mounted within the chamber 140 on the bottom wall 136 of the housing. Other heating mechanisms, including but not limited to burners using natural gas or fossil fuels, can also be utilized an the mounting adjusted accordingly without detracting from the invention.

The dryer 119A also includes a fan 150 positioned in communication with the chamber 140 so as to displace air warmed by the heating element 148 toward the opening 142. A variable speed fan 150 with a 9½ inch diameter, one eighth horsepower squirrel cage blower has been found to provide good results. An electrical control box 152 houses various conventional switches, timers, and controls for the fan 150 and the heating mechanism 148. A plurality of roller casters or wheels 154 can be mounted to the bottom wall 136 or side wall 138 of the dryer 119A to make it conveniently movable across the floor.

The basket 14 includes a pair of upwardly extending elongated lifting brackets 156 which are equally spaced circumferentially along the cylindrical wall 80 of the basket 14. The lifting brackets 156 are identical in construction and have an upper end 160, a lower end 162 and a central portion 164 therebetween. The lower end 162 of each lifting bracket 156 is pivotally attached to spacer brackets 166 mounted on the wall 80.

The spacer bracket 166 protrudes radially outward from the wall 80 of the basket 14 so as to perform two functions. First, the spacer bracket 166 has a downwardly extending tab or flange 168 at its lower end that makes it useful in resting the basket 14 on top of the tank 12 for draining or other purposes. Second, the spacer bracket 166 provides the radial clearance necessary for mounting the lifting brackets 156 to the basket 14 so as to provide quick dumping of the contents as described below. To this end, spacer bracket 166 has a hole 167 therein.

The upper end 160 of the lifting bracket 156 has a hole 170 therein adapted to receive a hook attached to a conventional hoist, neither of which are shown. The central portion 164 of the lifting bracket 156 has a hole 172 therein adapted to receive a removable, lockable fastening means 174, such as a locking pin, which securely holds the lifting bracket 156 and thereby the basket 14 in an upright position by also extending into the hole 167 in the spacer that is aligned with the hole 172 in the lifting bracket 156. When hoisted into the air and positioned as desired, the basket 14 can be easily pivoted about the lower end 162 of the lifting brackets 156 for quick dumping of the contents when the locking pins 174 are removed. The vertical position of the lower end 162 of both lifting brackets 156 with respect to the basket 14 is established based on the centers of gravity of the basket 14 in loaded and empty conditions and the desired speed of dumping.

Figure 2:
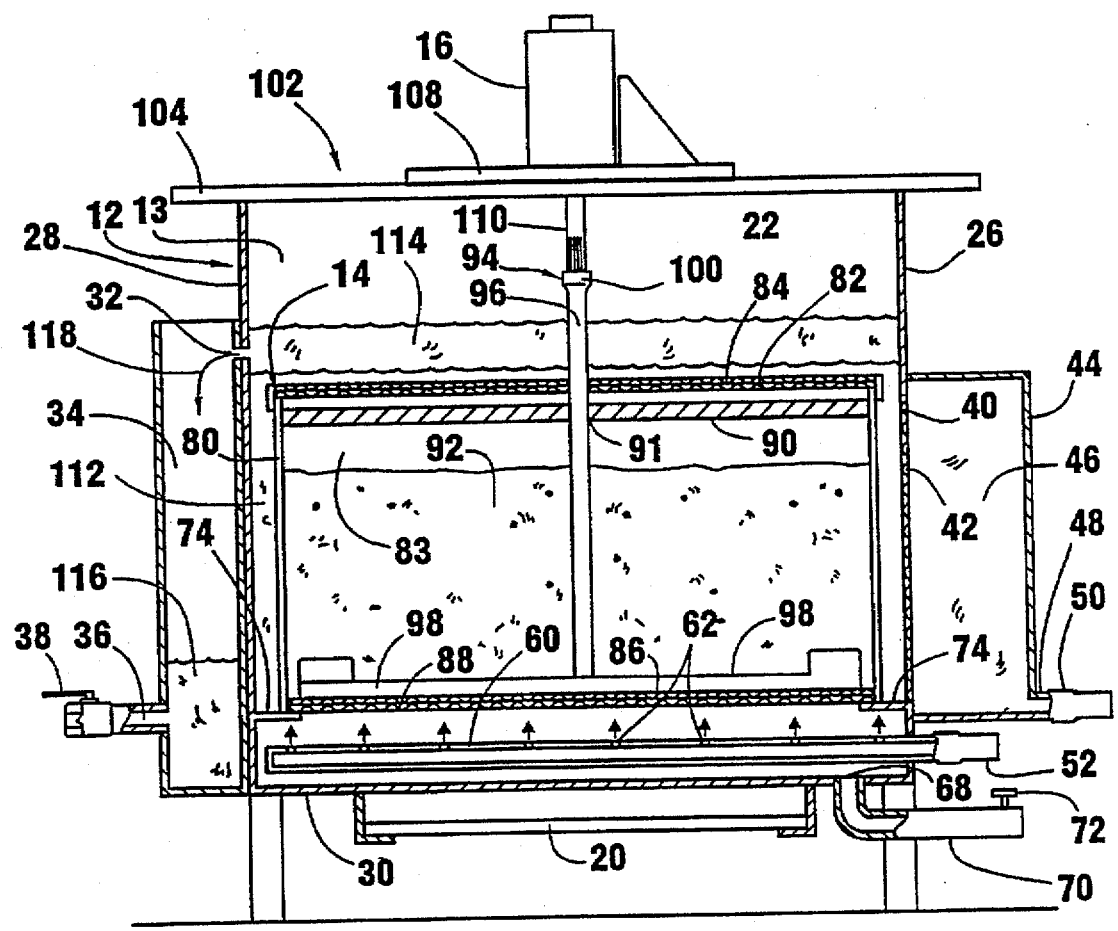
FIG. 2 is a sectional view of the apparatus of FIG. 1.

In order to dry the reusable material 128, the basket 14 is removed from the washer cleaning chamber 13 with a conventional hoist that engages the quick-dumping lifting brackets 156 on the basket 14. Then the basket 14 containing the moist reusable material is lowered to rest on top of the housing 132 between the guide brackets 144 so that screens 86 and 88 (see FIG. 2) with the reusable material thereon are in covering relation with the opening 142 as shown in FIG. 5. Thereafter, the fan 150 and then the heating mechanism 148 are activated, providing a flow of warm, dry air through the reusable materials in the basket 14. The air blown over the reusable materials is heated to over 180° F., and preferably to 200°–220° F. The flow of warm air is maintained until the reusable materials in the basket 14 are acceptably dry.

The basket 14 is hoisted from the dryer 119A by lifting brackets 156 and positioned as desired to discharge the contents. Then the locking pin 174 on each lifting bracket 156 is removed from hole 167 by the operator. Thereafter, the contents can be dumped by tipping the basket 14 in the direction needed. This apparatus provides a method that is significantly quicker, easier and safer than the prior art, which involved unhooking the basket from the hoist and using some measure of brute force to manipulate it.

The above disclosure shows that the present invention is useful for removing a material, such as oil, that is designated as hazardous by the United States Environmental Protection Agency from recyclable and reusable material, such as floor dry.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A portable apparatus for washing and drying remediated materials, the apparatus comprising:

a portable housing having a top, a bottom wall, and at least one side wall interconnecting said top and bottom wall to define a chamber within said housing, said housing having a flue therein connected to said chamber and an opening in said top, said bottom wall, and said side wall;

a plurality of caster wheels each being pivotally and rotatably mounted on the housing for engaging a supporting surface and allowing the housing to move in any direction therealong;

a heating mechanism positioned adjacent said flue and thereby in communication with said drying chamber;

a fan positioned in communication with said chamber so as to displace air warmed by said heating mechanism toward said opening;

a washer tank holding a liquid washing fluid;

a removable porous basket containing said remediated materials and fitted within said washer tanks for holding said remediated materials during washing, said basket being adapted to fit in covering relation over said openning such that said warm air is forced through said porous basket by said fan and dries said remediated material contained therein.

2. The dryer of claim 1 wherein said basket completely covers said opening.

3. Apparatus for washing and drying remediated materials comprising:

a washer tank holding a liquid washing fluid;

a removable basket containing said remediated materials and fitted within said tank for holding said remediated materials during washing;

said basket comprising side walls, a top wall, and a bottom wall, said side walls of said basket being shaped into a predetermined configuration, said bottom wall of said basket comprising a screen shaped in said predetermined configuration and having a plurality of openings therein said top wall having openings therein;

a dryer housing having side walls forming an upwardly presented dryer opening corresponding in size and shape to said predetermined configuration of said side walls and said screen of said basket;

guide brackets on one of said basket and said dryer housing for holding said basket in a stacked position above said dryer housing with said screen registered in covering relation over said dryer opening whereby said side walls of said basket and said side walls of said dryer housing form a substantially continuous conduit for the passage of air through said screen;

a blower connected to said dryer housing for directing a stream of air through said dryer opening and through said screen;

a heating element for heating said stream of air before said stream of air passes through said dryer opening and said screen lifting brackets on said basket for facilitating the lifting of said basket to place said basket on or remove said basket from said stacked position.

* * * * *